United States Patent [19]

Hurlbut

[11] 4,197,004

[45] Apr. 8, 1980

[54] SCROLLING MICROFICHE AND METHOD OF PRODUCING THE SAME

[75] Inventor: Donovan W. Hurlbut, Whitewater, Wis.

[73] Assignee: News Log International, Incorporated, Whitewater, Wis.

[21] Appl. No.: 912,996

[22] Filed: Jun. 6, 1978

[51] Int. Cl.² .............................................. G03B 27/42
[52] U.S. Cl. ........................................ 355/53; 354/94; 355/54; 355/77
[58] Field of Search ..................... 355/53, 54, 40, 77; 354/110, 120–125, 94

[56] References Cited

U.S. PATENT DOCUMENTS

| | | | |
|---|---|---|---|
| 536,105 | 3/1895 | Stowell | 354/122 |
| 928,724 | 7/1909 | White | 354/94 |
| 3,318,218 | 5/1967 | Yax | 354/122 |
| 3,449,049 | 6/1969 | Harding et al. | 354/123 X |
| 3,667,364 | 6/1972 | Mann | 354/123 X |

Primary Examiner—Richard A. Wintercorn
Attorney, Agent, or Firm—Hill, Van Santen, Steadman, Chiara & Simpson

[57] ABSTRACT

In contrast to standard microfiche devices in which discrete areas of information storage are provided in an x–y array, a scrolling microfiche includes a plurality of parallel rows of information storage areas in which, in at least one of the rows, a plurality of information storage areas contain information which bridges from one area to the next and completes the information stored from one area to the next so that the fiche may be scanned and an area may be read without the observation of frame divisions between frames. The fiche is produced by photographic processes. In one embodiment the process includes the generation of original elongate strip artwork, laying out the strips with respect to a rotary camera, reproducing each strip as a separate row on microfiche film, repeating laying out and reproduction as necessary for completion of the story of the fiche, and subsequent cutting operations and the like to produce a scrolling microfiche. In another embodiment, the original artwork is generated as individual plats which are reproduced on film as other, secondary, originals. The secondary originals are then microcomposed and reproduced with pagenating from area-to-area so as to reproduce the artwork in a reduced form which is equivalent to the elongate strips of the first embodiment. The process includes repeating microcomposing and reproduction, with pagenating, as necessary for completion of the story, on a microfiche structure, so that each row of the microfiche contains a portion of the story. The result is, again, a scrolling microfiche.

8 Claims, 6 Drawing Figures

SCROLLING MICROFICHE AND METHOD OF PRODUCING THE SAME

PATENT DISCLOSURE DOCUMENT

This invention is documented in a patent disclosure document, No. 050086, filed June 14, 1976.

BACKGROUND OF THE INVENTION

1. Field of the Invention

The present invention relates to microfiche and more particularly to a scrolling microfiche which has contiguous information storage areas which bridge and complete the information from one frame to the next, and to a method for producing such microfiche.

2. Description of the Prior Art

Heretofore, the term microfiche has been used to describe, in general, a photographic film structure which is approximately sized as a 4⅛"×5 13/16" card area which has a maximum image boundary of 3⅞"×5½". Within this boundary, a plurality of individual storage areas are provided, each separated from the other by a frame division gap. As the fiche is read from one frame to the next, the viewer displays the moving fiche and the frame division gaps between the frames.

SUMMARY OF THE INVENTION

For certain applications, particularly in connection with educational applications, it is highly desirable to provide a microfiche that has a story thereon and which can be read with a microfiche viewer such that certain scenes are displayed in which the scene moves in sequence with the story line, and in which there are no frame division gaps which can be seen by an observer.

It is therefore the primary object of the invention to provide a microfiche which has rows of information areas in which groups of information areas form a continuous scene constructed from contiguous information areas in which the contiguous portions of the information areas bridge, complement and complete the information from one storage area to the next.

As used herein, scrolling is defined as the continuous reading of a plurality of storage areas over which the information content flows, without interruption, from one storage area to the next and in which there are no frame division gaps between the storage areas. Scrolling or a scrolling microfiche, is provided by a technique called pagenation. Pagenation is a process by which adjacent portions of adjacent frame areas are harmoniously and continuously blended so that there is no distinction across an entire group of storage areas as to where a "frame" begins and ends. With this technique, a panoramic view across a plurality of storage areas may be formed and read without the provision of frame division gaps therebetween. Needless to say, this is not a typical x-y random access system of the type generally known in the art, although x-y random access is anticipated in the system, as will be evident from the description below.

Another object of the invention is to provide methods by which scrolling microfiche may be produced.

According to the invention, a scrolling microfiche card comprises a prescribed sequence of content columns (text or graphics) of variable widths which, when moved from right to left, fill the screen at all times and allows a full width column advancing to the left to be replaced by a full width column appearing on the right of the screen.

Also according to the invention, the information areas form parallel rows which are scanned in a serpentine manner such that the rows begin at alternate ends of the fiche.

The scrolling fiche may be produced by various techniques. Two embodiments are disclosed herein.

According to a first embodiment of the method of the invention, and assuming standard microfiche dimensions, original artwork is produced, including panoramic views, and having a maximum length of 11 feet and a height of 8½". These originals are laid out with respect to a rotary camera and reproduced as a separate row on 105 mm microfiche film with the rotary camera. Layout and reproduction are repeated for each row of the microfiche, as is necessary for completion of the story. The resulting product is a scrolling microfiche.

In a second embodiment, the original artwork may be in the form of original plats or elongate strips. The original plats or strips are reproduced on 35 mm film, for example, to provide secondary originals. These secondary originals are then processed by microcomposition and reproduction, including pagenating, with a microform reduction printer, repeating microcomposition and reproduction, as necessary, to complete the story. Again, the resulting product is a scrolling microfiche.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
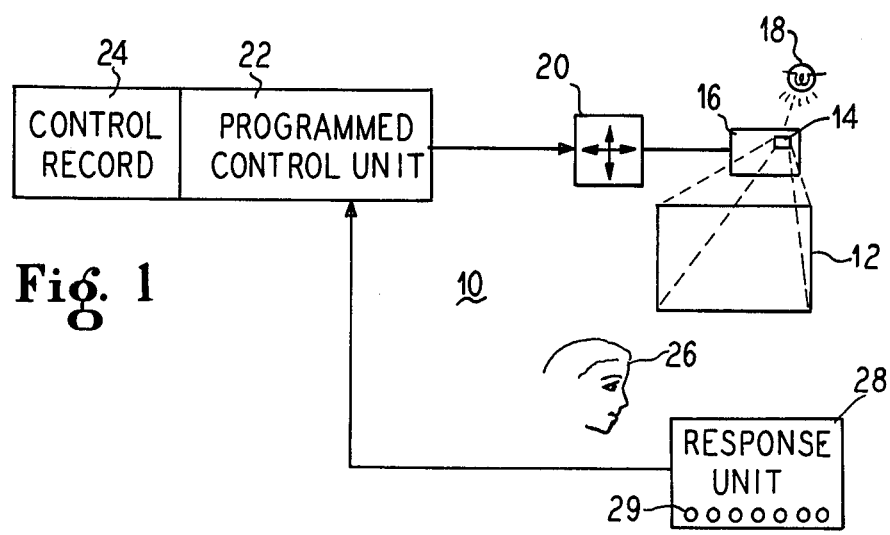
FIG. 1 is a block diagram representation of a microfiche reading system which may be employed in utilizing the present invention.

Referring to FIG. 1, an extremely simplified system for using the present invention is illustrated generally at 10 as comprising a viewing screen 12 upon which an image from a frame 14 of a microfiche 16 is projected by means of a lamp 18 and by a suitable lens system (not shown). The microfiche 16 is positioned by an x-y positioner 20 under the control of a programmed control unit 22 which is programmed by a control record 24 which may be a manual input, such as a keyboard, and audio input or the like. For example, in an audio-visual system, an audio signal may be employed as a cue to cause the control unit to direct the x-y positioner to move the microfiche 16. As will be evident from the discussion below, different cues may be used, for example, for advance and stop in the x direction and in the y direction on a step-by-step basis or on a programmed sequential basis of intermittent start, run and stop operations.

The image of the screen 12 is viewed by an observer 26. If the system is set up as a teaching aid, the observer 26 will be a student who has at his disposal a response unit 28 with a plurality of response buttons 29 by which inputs may be fed to the program control unit, which inputs also affect the movement of the fiche. For example, the image may ask a multiple-choice question and a correct response by selection of the appropriate button 29 will cause the fiche to advance onward through an established program, while an incorrect selection may signal a repeat operation for reviewing a portion of the microfiche.

Figure 2:
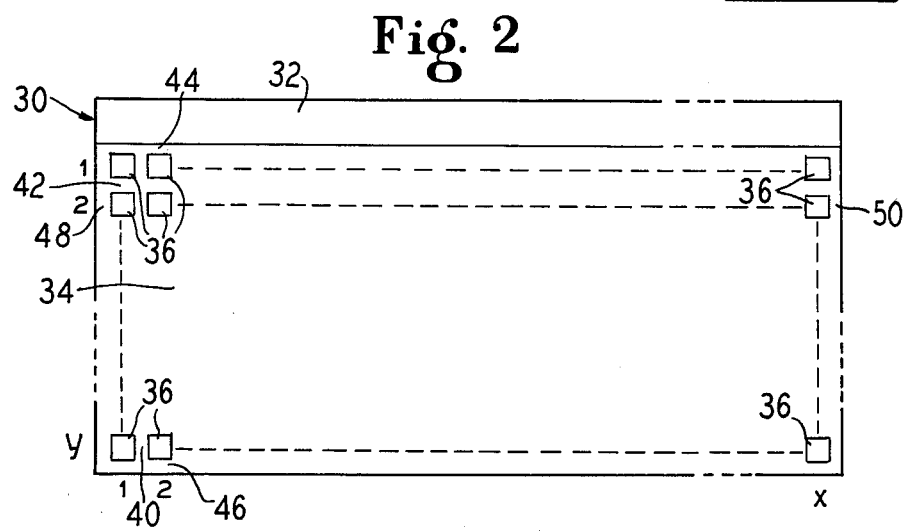
FIG. 2 is a schematic representation of a microfiche of the type generally known in the art.

Referring to FIG. 2, a conventional microfiche card, such as may be found in a parts catalog is generally illustrated at 30 as comprising a header 32 which may bear information as to the general content of the microfiche in the body 34. The information is contained in an array of frames 36 which are generally oriented in rows and columns in the x direction and in the y direction. The frames 36 are spaced in the x direction, as indicated by the space 40, and spaced in the y direction, as indicated by the space 42. The array of frames is also generally provided with a margin, as indicated by the spaces 44, 46, 48 and 50.

When used in the system of FIG. 1, the control record 24 and the programmed control unit 22 will cause the x-y positioner 20 to move the microfiche in the x direction and then in the y direction, for example, to access a particular frame. This movement may be step-by-step or may be a continuous movement in the x direction followed by a continuous movement of the y direction, for example.

With the foregoing conventional microfiche and system in mind, attention is invited to FIG. 3 for an explanation of the novel microfiche of the present invention, hereinafter referred to as a scrolling fiche.

Scrolling is a technique by which a continuous flow of projected fiche images may be obtained without the "black flash" breaks found between frames, such as in the spaces 40 in FIG. 2. The scrolling format comprises a prescribed sequence of content columns, either text or graphic, of variable widths which, when moved from right to left, for example, fill the screen at all times and permits a full width column advancing to the left to be replaced by a full width column appearing on the right of the screen.

The scrolling microfiche card herein may be a card which is $4\frac{1}{8}'' \times 5\ 13/16''$ with a maximum image boundary of $3\frac{7}{8}'' \times 5\frac{1}{2}''$. In one form of production the original documents employed were $8\frac{1}{2}''$ in height and had a maximum length of 11 feet, using 24× reduction.

Instead of conventional white image frames having black borders (film emulsion), in a preferred form of the invention a continuous white row of image of 0.354" high and 5.5" long (maximum was provided across the microfiche to be projected on a screen with a 24× lens. In the particular projection system utilized, the screen image was $11\frac{1}{2}''$ wide × $8\frac{1}{2}''$ high.

Columns widths may be, for example, 12, 15, $20\frac{1}{2}$ and 32 em.

As will be appreciated, when the scrolling microfiche is employed in a system of the type illustrated in FIG. 1, the sequence of viewing may be determined by formula and include any suitable type of programming and the microfiche reader will be provided with a scrolling mechanism and a retard mechanism which prevents random diagonal and vertical movements.

The scrolling concept provides a communication format where the presentation is displayed under controlled visibility parameters with each visual segment being contiguously and continuously related to adjacent segments. As mentioned above, scrolling entails the continuous flow of image without black flash breaks.

In the scrolling concept a frame is the distinct portion of the screen space and cannot be compared to a conventional frame in which each frame has a definite boundary, such as the spaces 40 and 42 in FIG. 2.

Each frame of a scrolling microfiche and the content thereof is visually self-contained, both graphics and text, as well as integrated, both graphics and text with a contiguous frame.

The nature of the scrolling concept is such that all "frames" on view in the screening area are exposed to their full length and width, and as the "frames" move from right to left, for example, the "frame" advancing to the left is replaced by a "frame" appearing on the right. When lateral movement is stopped, the screen area has clear register on the right and on the left of the screen, regardless of the number of "frames" of original artwork or portions thereof on view on the screen.

The scrolling concept has been implemented using a modified Bell & Howell SR-IV microfiche feeder which has been modified for scrolling, suitable modifications also being disclosed in the aforementioned Disclosure Document No. 050086.

Figure 3:
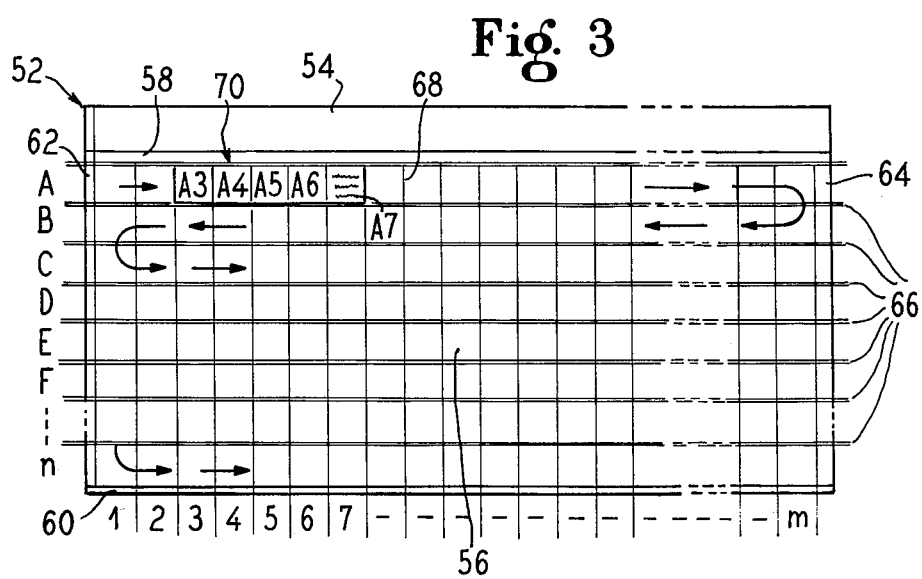
FIG. 3 is a schematic representation of a scrolling microfiche constructed in accordance with the present invention.

Turning now to FIG. 3, a scrolling microfiche is illustrated at 52 as comprising a header 54 and a body 56. The body 56 includes a peripheral margin at 58, 60, 62 and 64.

Inasmuch as the term "frame" as used in scrolling relates to an area and not to a discrete segment, the scrolling microfiche 52 does not have frames. Instead, the scrolling microfiche has a plurality of art areas established by an imaginary grid of lines 66, 68, the art areas extending in parallel columns A, B . . . n and column positions 1, 2 . . . m. Although there are no visible spaces at the imaginary grid lines 68, there may be visible spaces at the grid lines 66 so that these lines have been shown as double lines. The reason for this is that it has been determined that continuous scrolling over an entire microfiche is disturbing to the observer and that the observer desires "breaks" in the story being presented. It is advantageous to provide these breaks during scrolling as the fiche is moved from one column to the next, although scrolling could also occur from column-to-column.

In FIG. 3, a scrolling area 70 is indicated as comprising a plurality of storage areas A3, A4, A5, A6 and A7. All of these storage areas, with the exception of the storage area A7, are illustrated in FIG. 4 to better define the scrolling microfiche and the scrolling concept.

Figure 4:
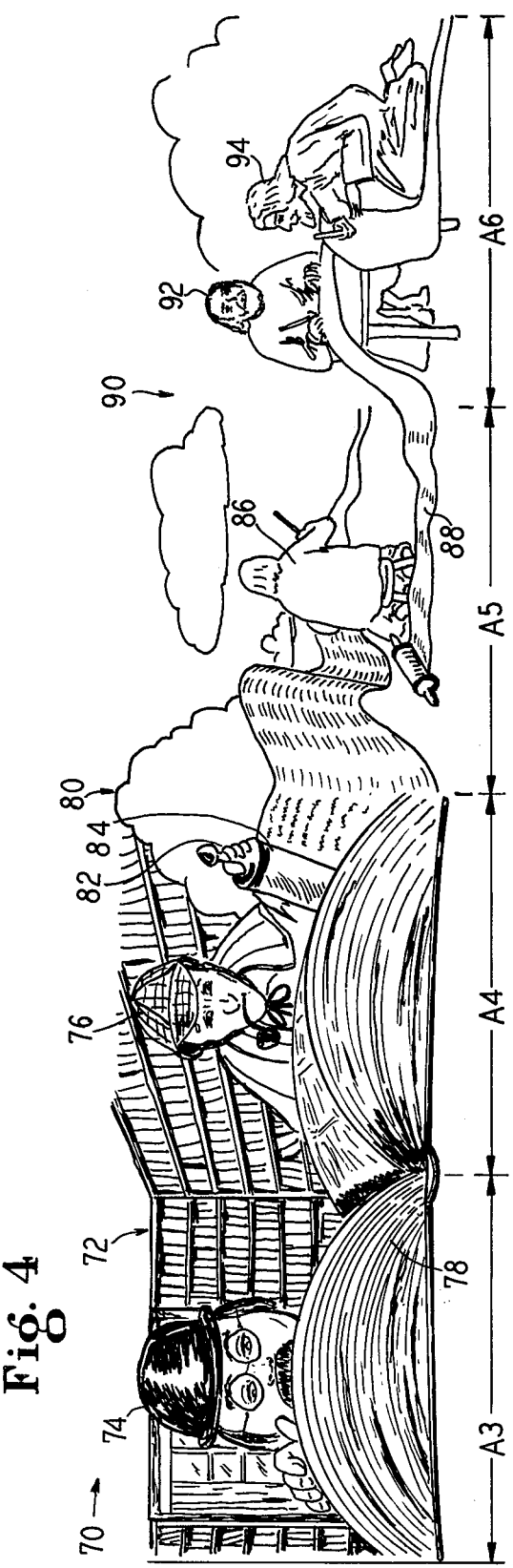
FIG. 4 is a detailed view of a portion of a row of frames of the microfiche of FIG. 3 specifically illustrating the scrolling feature of the present invention.

In FIG. 4, the group 70 of storage areas A3–A6 illustrates a story entitled "The Search for the Lost Gospel" in which in a library scene 72, Dr. Watson 74 and Sherlock Holmes 76 are engaged in a research project which involves the use of a book 78. The scene 72 extends over the storage areas A3 and A4.

In Holmes' left hand 82 is a scroll 84 of ancient writings. It will be appreciated that the portion of the storage area A4 adjacent Holmes' left shoulder blends into and forms a part of a scene 80 in which the scroll 84 extends over into the storage area A5 which depicts a person 86 who is writing the scroll 84 from what he has learned from another scroll 88.

The scroll 88 and the right-hand portion of the storage area A5 blend into a further scene 90 in which two other persons 92 and 94 are engaged in writing material, including the scroll 88.

As is evident from the content of FIG. 4, as one stands from left to right, an entire panoramic view is formed, not only of scenery, as is the usual case with panoramic view, but an historical panoramic view extending from the ancient writers 92 and 94 to the book 78 and to the persons of Sherlock Holmes and Dr. Watson. It will be appreciated that as one scans from left to right there are no black flashes as is conventional with microfiche cards.

As indicated on FIG. 3, the frame 87 may include text material which, again, may be contiguously and continuously blended with the information content of the storage area 86, and likewise with the subsequent storage area which would be designated A8. As indicated by the arrows in FIG. 3, the microfiche may be scanned in a serpentine manner such that the information flow begins at the left-hand side of columns A, C, E, etc. and at the right-side of columns B, D, F, etc. Of course, any information flow pattern may be employed and information breaks may be provided at desired locations on the body 56 of the scrolling microfiche 52.

Figure 5:
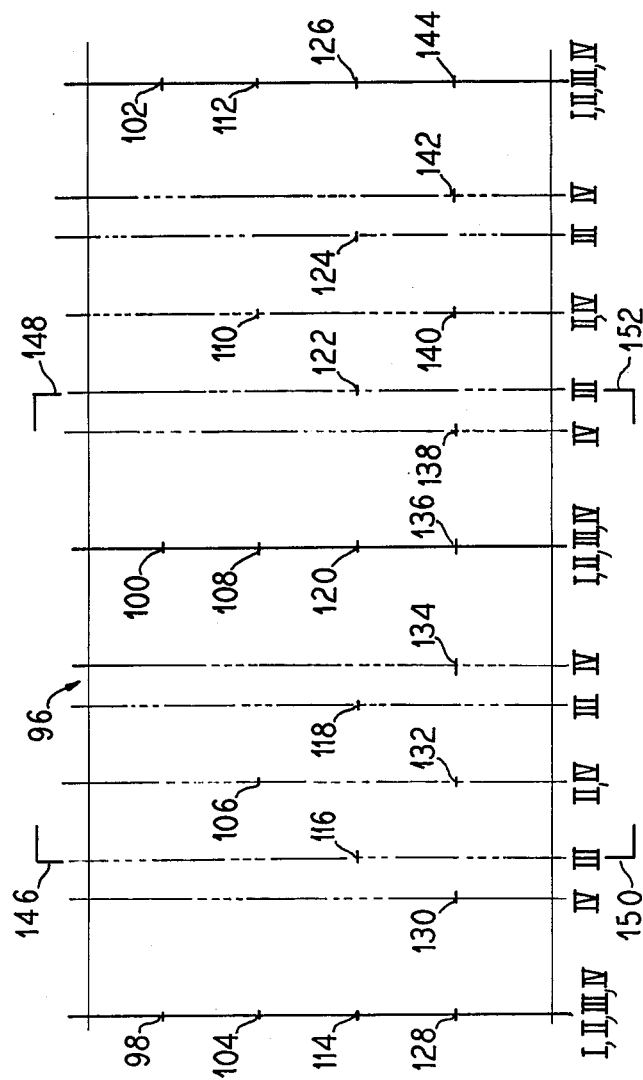
FIG. 5 is a schematic diagram which illustrates frame division and frame area definition as used in connection with the scrolling technique of the present invention.

In order to better illustrate the storage area and scrolling frame concept, a pair of storage areas are illustrated in FIG. 5 at 96 as extending between heavy, but imaginary, vertical lines. The first storage area extends between the vertical lines 98 and 100, while the second storage area extends between the vertical lines 100 and 102.

Each of the storage areas may be divided into smaller areas such as ½ areas, ⅓ areas, ¼ areas, 1/5 areas, etc.

The storage area 98–100 has been divided into halves by the imaginary line 106 and the storage area 100–102 has been divided by the imaginary vertical line 110. Therefore, there are four halves 104–106, 106–108, 108–110 and 110–112. For thirds, the storage area 98–100 has been divided by two imaginary vertical lines 116 and 118 while the storage area 100–102 has been divided by two imaginary vertical lines 122 and 124. Therefore, there are ⅓ storage areas 114–116, 116–118, 118–120, 120–122, 122–124 and 124–126.

For quarters, the storage area 98–100 has been divided by the imaginary vertical lines 130, 132, 134 while the storage area 100–102 has been divided by the imaginary vertical lines 138, 140 and 142. Across the two storage areas, therefore, there are eight quarters 128–130, 130–132, 132–134, 134–136, 136–138, 138–140, 140–142 and 142–144.

The above division can be repeated on any proportional basis for the storage areas. A frame, as mentioned above, relates to an area, which may be of the height of a storage area and any multiple or sub-multiple of the width of the storage area. It is advantageous at least for this discussion, to utilize a frame which has a width equal to that of a storage area. It will be apparent from FIG. 5 that a frame which extends from 146, 150 to 148, 152 covers ⅔ of the storage area 98–100 and ⅓ of the storage area 100–102. It is readily apparent, however, that any division would provide the same results with a frame selected to be equal to a storage area. However, it is also apparent that with scrolling, a frame may be larger or smaller than a storage area in that the scene is continuous from one storage area to the next.

The principle of dividing the storage areas is further illustrated along the bottom of FIG. 5 wherein the lines labeled I indicate whole storage areas, II indicates half storage areas, III indicates thirds of storage areas and IV indicates quarters of storage areas for the particular example given in FIG. 5.

Figure 6:
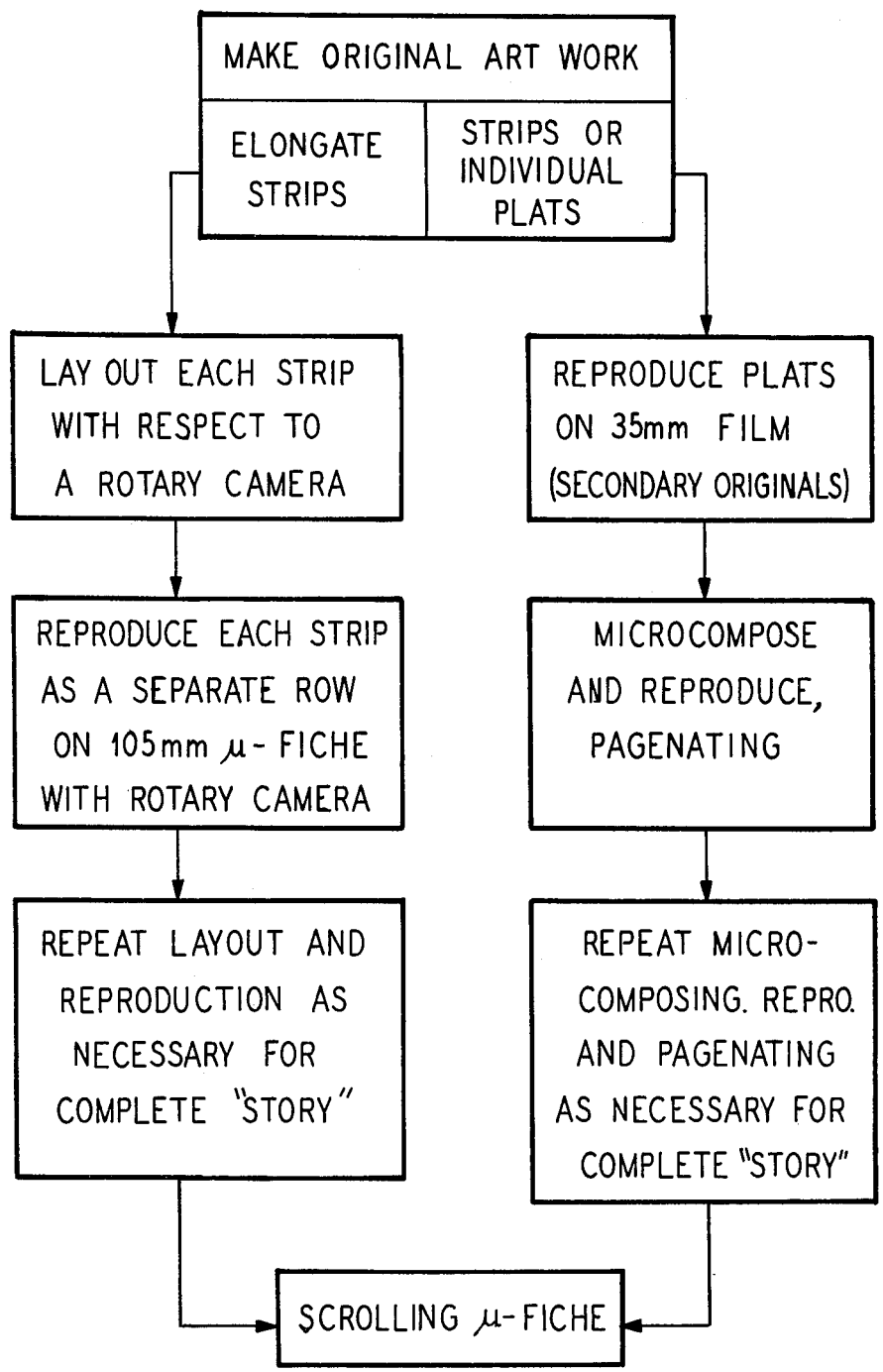
FIG. 6 is a flow chart which provides examples of making scrolling microfiche according to the present invention.

Referring now to FIG. 6, the method of making a scrolling microfiche will be discussed. First of all, the continuous flow of information from one storage area to the next is accomplished by a technique called pagenation. In each of the exemplary methods discussed below, pagenation occurs at different times because of the different types of artwork and reproduction involved. Referring to FIG. 6, two examples of a method for producing a scrolling microfiche are illustrated. In the first example, an original artwork is created in elongate strips of, for example, 11 feet in length. Each of these strips corresponds to a column A - - n of the scrolling microfiche 52.

If pagenation is only involved along the direction of a column, pagenation occurs in the creation of the original artwork.

In the next step an elongate strip is laid out with respect to a rotary camera. The next step is to then reproduce the elongate strip as a separate row on 105 mm microfiche film with the rotary camera.

Layout and reproduction are then repeated, as necessary, for completion of the story carried by the scrolling microfiche. The end product, of course, is the scrolling microfiche.

The foregoing example was accomplished with a rotary camera at Northern Micrographics, Inc. of LaCrosse, Wis.

In another example illustrated on FIG. 6, the original artwork is created as strips (less than a corresponding column length) or as individual plats, both of which are hereinafter referred to as plats. The next step is to reproduce the plats on, for example, 35 mm film as transparencies which then become secondary originals. The secondary originals are then microcomposed and reproduced while pagenating, as will be discussed below, and the microcomposition, reproduction and pagenation steps are then repeated, as necessary, for completion of the story carried by the scrolling microfiche. Again, the resulting produce is a scrolling microfiche.

Microcomposition, reproduction and pagenation were carried out with a microform reduction printer manufactured by MICRO-COPY of Indiana, Inc., 5325 Merchandise Drive, Fort Wayne, Ind., which is also disclosed in U.S. Pat. No. 4,059,355, issued on Nov. 22, 1977 to Robert E. Fritsch.

With this type of system, two 35 mm transparencies may be projected adjacent one another on a viewing screen and imaging thereof may be controlled so as to blend the contiguous portions thereof. The same image is then presented to the microfiche film of the camera.

Each of the foregoing examples of a method for producing a scrolling microfiche has its particular advantages. For example, creating the original artwork as elongate strips includes pagenation so that it is not necessary to align and control the imaging for a pair of transparencies. In short, pagenation is precise and accurate. On the other hand, it is much easier to handle the transparencies (slides) and to create the same from individual plats then to produce an original artwork as an elongate strip. The only other disadvantage involved in utilizing the rotary camera is that it was necessary for my colleagues and me to slow the speed of the camera for our purposes.

Although I have described my invention with respect to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A microfiche comprising:
   a plurality of first information storage areas, each of said first storage areas bearing information;
   a group of at least some of said areas being contiguous with the information borne by adjacent areas and bridging to and continuing the information of the adjacent areas;
   a plurality of second information storage areas each bearing information which is different from the information borne by said first storage areas;
   the information borne by said first storage areas forming a continuing scene and the information borne by said second storage areas bearing information relating to the scene.

2. The microfiche of claim 1, wherein:
   the first-mentioned information comprises characterizations of animate and inanimate objects, and
   the second-mentioned information includes alphanumeric data concerning the animate and inanimate objects.

3. The microfiche of claim 1, wherein:
   said storage areas are arranged in parallel rows with the rows beginning at alternate ends of the fiche so that the fiche may be scanned in a serpentine manner.

4. An optically readable storage medium comprising a microfiche including a generally clear background, a plurality of information storage areas on said clear background, said storage areas arranged in a plurality of parallel rows,
   a group of said storage areas in at least one of said rows being contiguous and bearing information which bridges adjacent areas of the group to form a continuous scene over the length of the group, and
   some of said storage areas which are not in a scene group bear alphanumeric information relating to the scene.

5. In a microfiche of the type which has a plurality of discrete information storage areas arranged with divisions therebetween in a plurality of rows, the improvement wherein each of said storage areas is formed contiguous with each adjacent area of the respective row so that the individual areas are not discrete and any selected area along a row may be read without the appearance of the divisions, at least one row of said storage areas including a group of said areas in which the information content thereof forms a continuous pictorial scene, and at least one of said storage areas including alphanumeric information relating to the information of said scene.

6. The improved microfiche of claim 5, wherein each of said storage areas comprises information content which is related in a sequence to the information content of each other storage area, and said storage areas are arranged in a serpentine sequence so that the information content of the rows begins at alternate ends of the fiche for permitting serpentine scanning.

7. A method of making a microfiche containing a story, comprising the steps of:
   producing a continuous scene of at least one original artwork by producing the original artwork on elongate strips;
   reproducing the original artwork on a microfiche structure with the scene extending along a column of the microfiche structure to produce a continuous scene by photographing each strip with a rotary camera as a separate column on the fiche; and
   repeating the step of reproducing on respective columns of the microfiche structure as necessary to complete the story.

8. A method of making a microfiche containing a story, comprising the steps of:
   producing a multi-plat original artwork constituting a continuous scene;
   reproducing the original artwork on film to form secondary originals; and
   micro-composing and reproducing the secondary originals in a microform reproduction printer, aligning the secondary originals so that the information thereof is continuous from one secondary original to another without division lines therebetween, and reproducing the aligned secondary originals on a microfiche structure.

* * * * *